United States Patent [19]

Schooler et al.

[11] Patent Number: 5,775,776
[45] Date of Patent: Jul. 7, 1998

[54] LOCK FOR SEAT BACKS

[75] Inventors: Paul Schooler, Fraser; Philip J. Sandula, Dryden, both of Mich.

[73] Assignee: Seating Specialities, Inc., Davison, Mich.

[21] Appl. No.: 786,260

[22] Filed: Jan. 22, 1997

[51] Int. Cl.$^6$ ........................................ B60N 2/02
[52] U.S. Cl. ................................ 297/375; 297/383
[58] Field of Search ............................ 297/383, 375, 297/353, 463.1

[56] References Cited

U.S. PATENT DOCUMENTS

| | | | |
|---|---|---|---|
| 1,326,275 | 12/1919 | Koerner. | |
| 1,889,478 | 11/1932 | Hultgren. | |
| 2,170,509 | 8/1939 | Schumpert | 155/163 |
| 2,283,485 | 5/1942 | Beck | 155/161 |
| 2,728,379 | 12/1955 | Perry | 155/156 |
| 2,809,691 | 10/1957 | Norwood et al. | 155/161 |
| 3,226,158 | 12/1965 | Strien et al. | 297/361 |
| 3,286,971 | 11/1966 | Walter et al. | 248/429 |
| 3,709,535 | 1/1973 | Rothermel | 297/306 |
| 3,954,245 | 5/1976 | Costin | 248/400 |
| 4,178,037 | 12/1979 | Pickles | 297/326 |
| 4,257,647 | 3/1981 | Gianessi | 297/336 |
| 4,389,070 | 6/1983 | Chien | 297/365 |
| 4,565,404 | 1/1986 | Rauschenberger | 297/19 |
| 5,080,434 | 1/1992 | Locher | 297/301 |
| 5,161,856 | 11/1992 | Nishino | 297/367 |
| 5,320,413 | 6/1994 | Griswold et al. | 297/362.12 |
| 5,496,092 | 3/1996 | Williams et al. | 297/250.1 |
| 5,558,402 | 9/1996 | Yamada | 297/363 |
| 5,622,410 | 4/1997 | Robinson | 297/367 |

*Primary Examiner*—Peter M. Cuomo
*Assistant Examiner*—Stephen Vu
*Attorney, Agent, or Firm*—Howard & Howard

[57] ABSTRACT

Several locks for locking a seat back relative to a seat bottom are disclosed. The locks include members which are moveable into notches in a rod to lock the rod within a block. In one embodiment, an axially moveable pin forces a ball into a notch in the rod to lock the rod at a desired location. In a second embodiment, an axially moveable tooth is selectively moved into or out of a notch in the rod. In a third embodiment, a rotating cam forces a lock seat onto the rod to lock the rod at a desired location. Finally, a power driven embodiment is also disclosed.

6 Claims, 4 Drawing Sheets

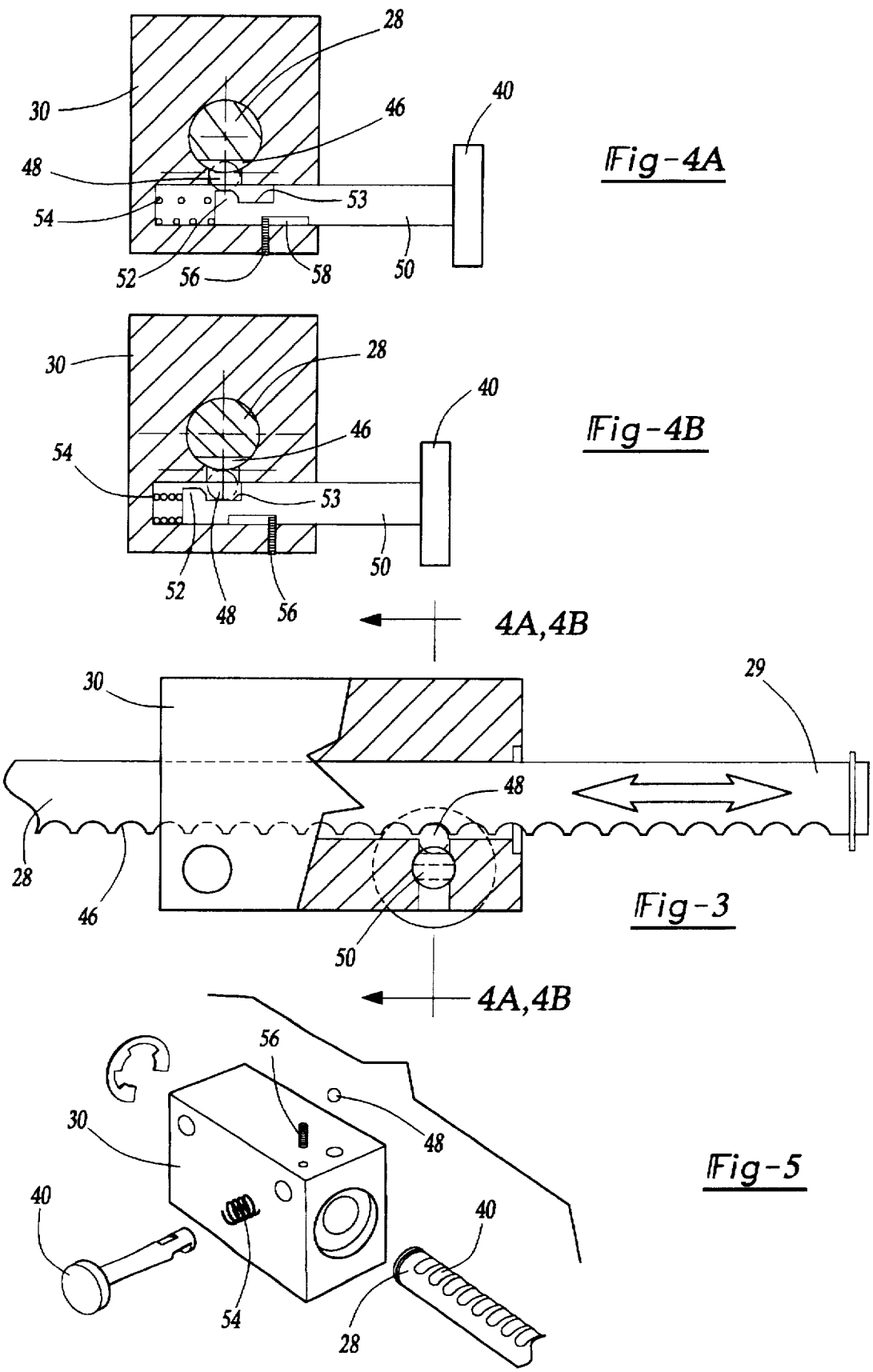

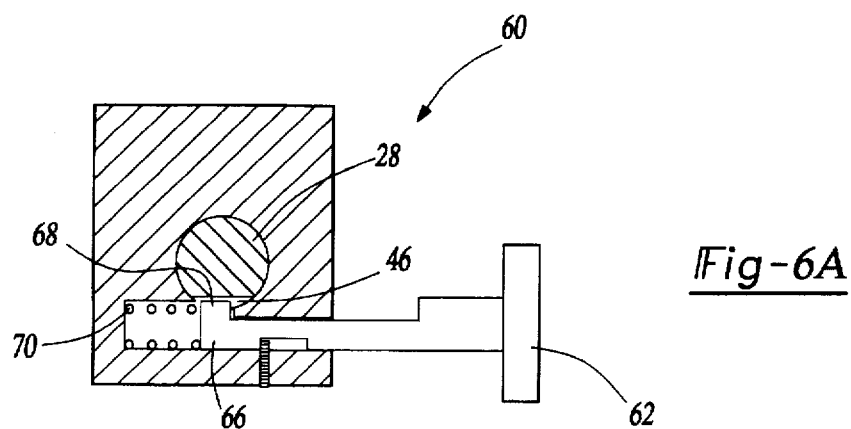
_Fig-6A_
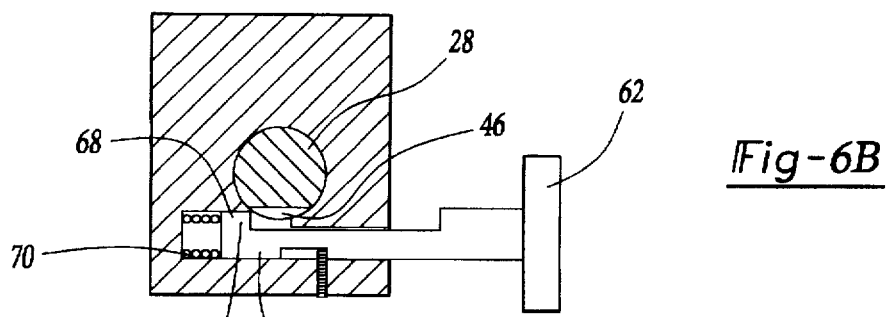
_Fig-6B_
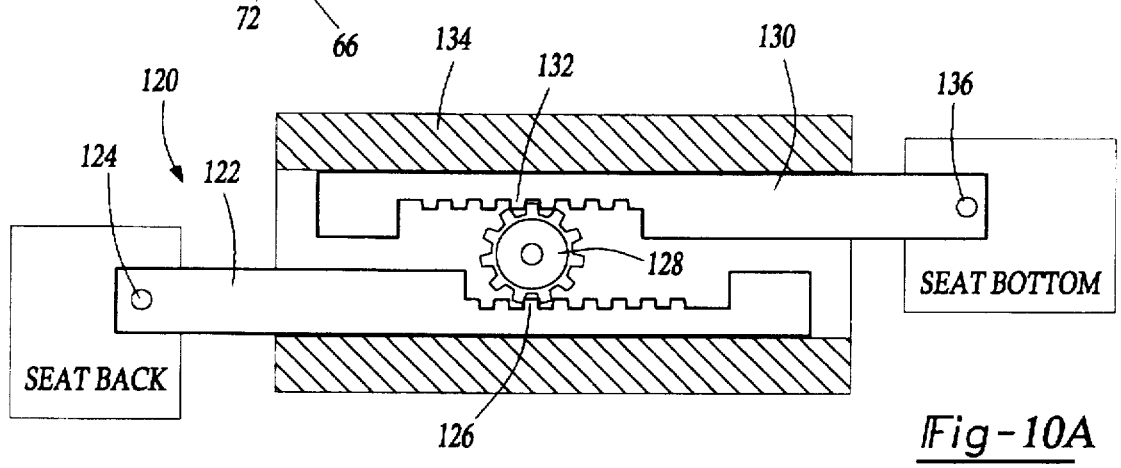
_Fig-10A_
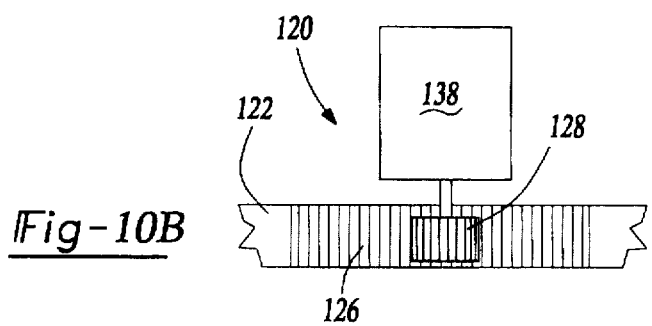
_Fig-10B_

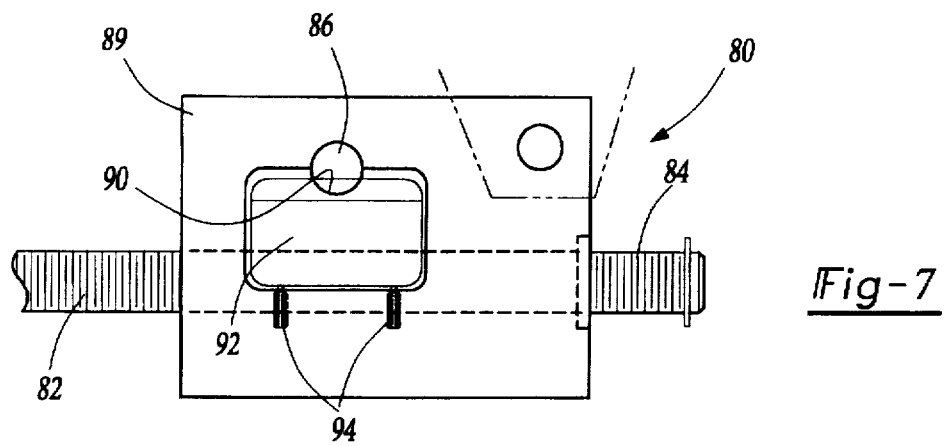
*Fig-7*
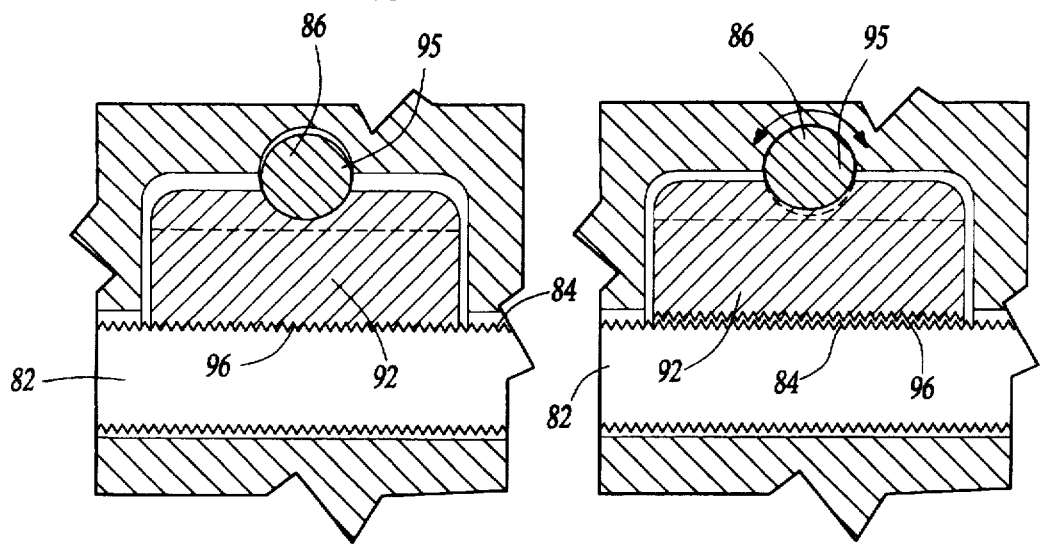
*Fig-8A*  *Fig-8B*
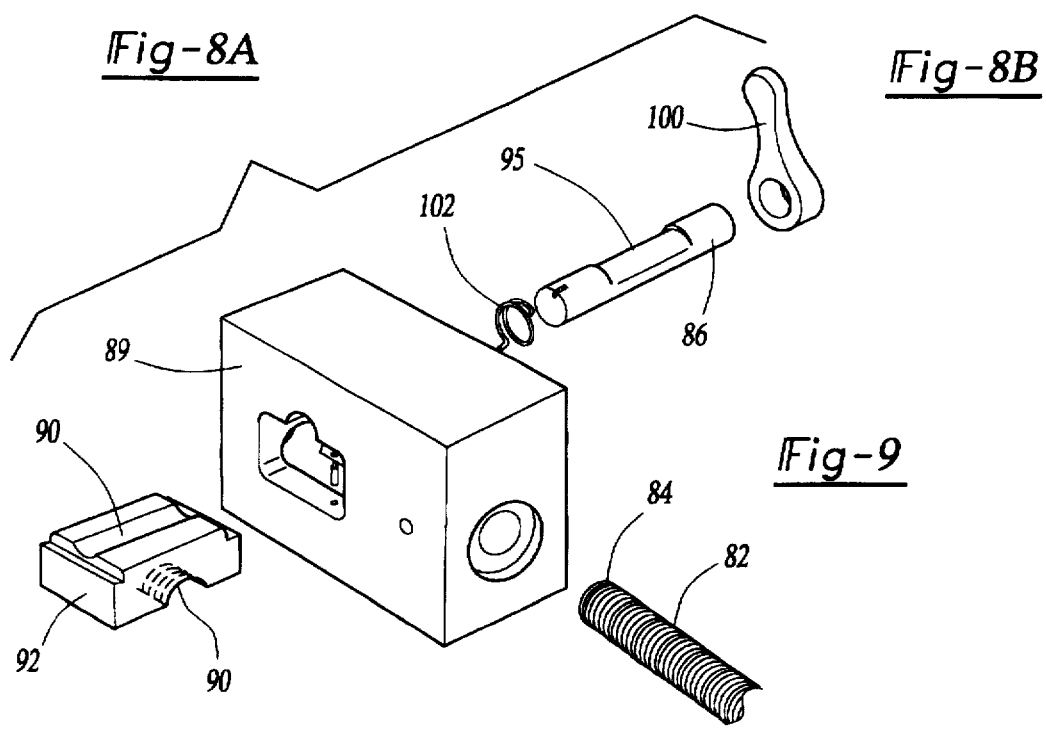
*Fig-9* ns, 5,775,776

LOCK FOR SEAT BACKS

BACKGROUND OF THE INVENTION

This invention relates to locks for preventing pivoting movement of a seat back relative to a seat bottom, that may be released to allow the seat back to pivot.

In the prior art, vehicle seats pivot relative to the seat bottom. Such pivoting movement is allowed, for instance, when allowing a passenger access to a rear seat positioned behind a forward seat. In such a case, the forward seat is allowed to pivot forwardly and move upwardly to provide access for the passenger to the rear compartment.

With these prior art systems, the seat back must be locked relative to the seat bottom during normal operation. It would be undesirable for the seat back to move relative to the seat bottom in response to forces that are to be expected by the vehicle. In addition, it would be desirable to have a very secure lock between the seat back and the seat bottom that would prevent undue movement of the two relative to each other in the event of a collision.

The prior art has not provided an adequately strong lock between the seat back and the seat bottom that is also readily releasable to selectively allow the seat back to pivot relative to the seat bottom.

In the prior art, the locking mechanisms have essentially included spring bias members having a spring force holding locking members to lock the rod and hence, the seat back. The spring force has been selectively releasable to allow the rod to move relative to the block. These types of structures have not provided very secure holding forces. The spring force cannot be too large or it will not be easily releasable by an operator. As such, there has not always been sufficient spring force to lock the seat back as would be desired.

SUMMARY OF THE INVENTION

In a disclosed embodiment of this invention, a seat back is locked securely relative to the seat bottom, and is easily releasable to allow the seat back to pivot relative to the seat bottom. In one type of lock, a rod is fixed to the seat back at the pivot point with the seat bottom. The rod slides within a block fixed to the seat bottom. If the rod slides relative to the block, then the seat back may pivot relative to the seat bottom. A lock is provided within the block that includes a locking portion that moves into a notch in the rod, to lock the rod relative to the block. The locking portion is selectively removable to allow the rod to slide within the block and allow the seat back to pivot relative to the seat bottom.

In one specific embodiment, the lock includes a pin that may be moved axially to force a ball into the notch in the rod and lock the rod at a selected location. The rod is preferably formed with a plurality of notches at incrementally spaced axial positions. The sliding pin preferably has a channel at a forward end. If the pin is moved inwardly, then the ball is allowed to move into the channel and the rod may slide within the block. However, a spring biases the pin outwardly such that a cam face forces the ball upwardly into the notch in the rod, locking the rod against movement. If the rod is locked within this block, then the seat back is locked against pivoting relative to the seat bottom.

In a second similar embodiment, the sliding pin includes a tooth which is selectively moved into the notch in the moving rod. The tooth selectively locks the rod within the block.

In yet another embodiment, a rotating cam member rotates a lock seat downwardly onto the rod. The rod may be formed with notches that are similar to screw threads, and the lock seat may have a surface facing the rod which is formed with locking portions that are provided by mating threads. When the cam is turned, it forces the lock seat onto the rod and its threads move into the threads on the lock seat. This again provides a secure connection. In other envisioned embodiments, the lock seat may be formed without threads, and the rod may be formed without threads. The simple camming force from the rotating pin and the lock seat is sufficient to lock the rod within the block.

In another feature, the actuation for releasing the rod on one side of the vehicle seat is interconnected to the other side such that a single actuation movement releases both sides of the seat and allow the seat back to pivot about a hinge axis.

In a further embodiment, the lock is controlled by a power driven pinion gear which drives a pair of opposed racks. The opposed racks are moveable within a block. By driving the racks relative to each other, the seat back is allowed to pivot. In one sense, the pinion gear teeth move into the gear teeth on the rack, and lock the racks. As the pinion gear moves it allows the rack to move, thus allowing the seat back to pivot.

These and other features of the present invention can be best understood from the following specification and drawings, of which the following is a brief description.

BRIEF DESCRIPTION OF THE DRAWINGS

FIG. 3 is a cross-sectional view through a first embodiment seat lock.

FIG. 4A a cross-sectional view along line 4a—4a as shown in FIG. 3.

FIG. 4B is a cross-sectional view along line 4b—4b as shown in FIG. 3.

FIG. 5 is an exploded view of the first embodiment.

FIG. 6A shows a second embodiment lock in a locking position.

FIG. 6B shows the second embodiment lock in a released position.

FIG. 7 shows a third embodiment lock.

FIG. 8A shows a third embodiment lock in the locked position.

FIG. 8B shows the third embodiment lock in its released position.

FIG. 9 is an exploded view of the third embodiment lock.

FIG. 10A is a side view of another embodiment.

FIG. 10B is a schematic view of a portion of the FIG. 10A embodiment.

DETAILED DESCRIPTION OF A PREFERRED EMBODIMENT

Figure 1A:
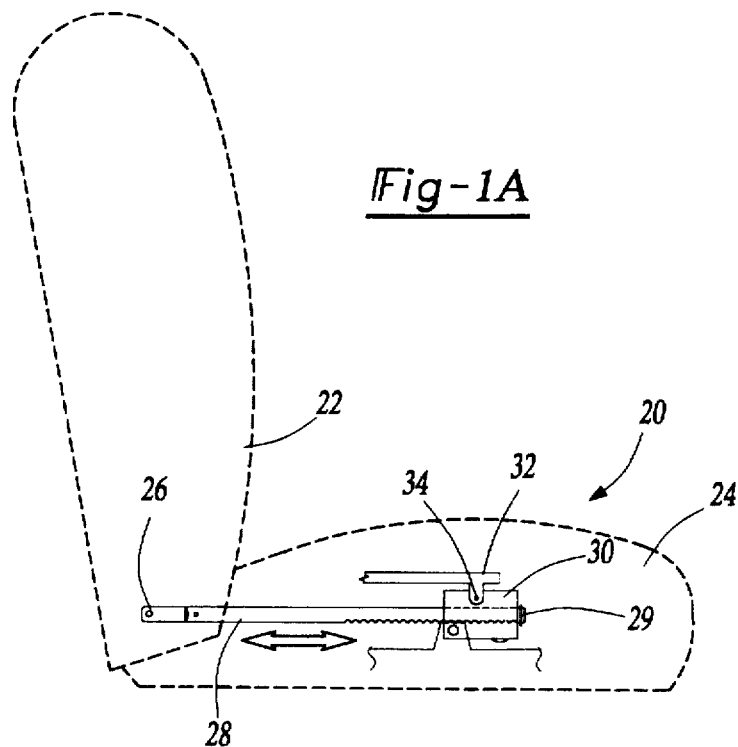
FIG. 1A schematically shows a seat in a normal operational position.

FIG. 1A shows a seat 20 having a seat back 22 which is may pivot relative to a seat bottom 24. A hinge axis 26 connects the seat back 22 to the seat bottom 24. A rod 28 is fixed to the seat back 22 at the hinge axis 26. The rod prevents pivotal movement of the seat back relative to the seat bottom in a locked position at which it is locked within a block 30. As shown, block 30 is fixed to a frame 32 of the seat bottom 24 at a pin 34. If the rod 28 is fixed within block 30, then the seat back 22 may not pivot relative to the seat bottom 24. As shown in the FIG. 1A position, a forward end 29 of the rod 28 is stopped within the block 30. The forward end 29 may receive a clip to provide a stop at this location. Typically, a spring, not illustrated, drives the rod 28 forwardly when the lock is released.

It is desirable to provide a very secure locking force on the rod 28 locking the rod. This force holds the seat back 22 against pivoting inadvertently relative to the seat bottom 24 in response to a force on the seat such as may occur during a collision, etc.

Figure 1B:
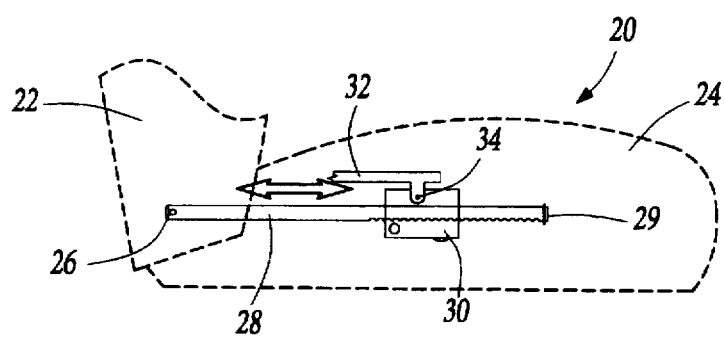
FIG. 1B shows the seat having pivoted forwardly.

FIG. 1B shows another position of this type of locking mechanism in which the rod 28 must be free to move forwardly relative to the block 30. As shown, the forward end 29 now extends beyond the block 32. This movement occurs when the seat back 22 pivots relative to the seat bottom 24.

Figure 2:
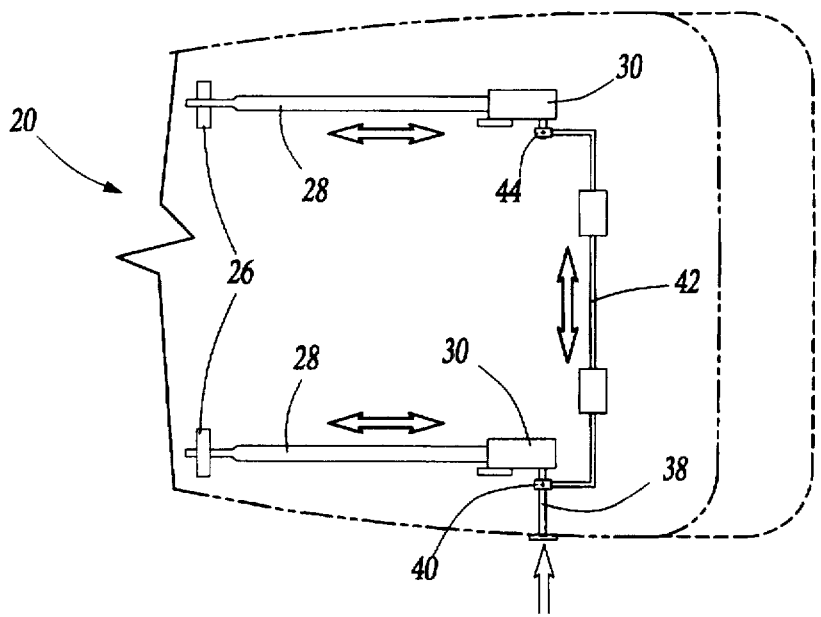
FIG. 2 is a top view of a mechanism for securing the seat back relative to the seat bottom.

As shown in FIG. 2, an actuation pin 36 includes a shaft 38 moving through a moving connector 40. Moving connector 40 actuates structure within the block 30 to release the rod 28, as will be explained below. Interconnection arms 42 and 44 provide the same actuation at the opposed block 30. Now, by actuating one side of the pin 36, the operator is able to release both blocks 30, such that both rods 28 may move forwardly or rearwardly relative to the block 30. The operation of the lock mechanisms of this invention will be disclosed with reference to only one block 30, however, it should be understood that a similar actuation is ongoing at both blocks 30 in a preferred embodiment. While this embodiment shows axial movement of the pin 36 to release the blocks 30, it should be understood that in embodiments that require rotation, for actuation, a similar connection can provide rotation from a first block 30 to the second block 30.

As shown in FIG. 3, in a first embodiment lock, the block 30 receives the rod 28. The rod 28 is provided with a plurality of incrementally spaced notches 46. The notches 46 allow advancement of the rod 28 inwardly or outwardly of the block to any one of several incrementally distinct locations. A ball 48 is shown forced into one of the notches 46 by a pin 50.

As shown in FIG. 4A, pin 50 may be associated with actuation member 40. The pin 50 has a forward cam surface 52 slightly forwardly of a channel 53. A spring 54 biases the pin 50 outwardly of the block 30. As shown, a locking set screw 56 is selectively received within a channel 58 in the pin 50 preventing pin 50 from moving outwardly of the block 30 due to the spring force from spring 54. In the position shown in FIG. 4A, the pin is biased outwardly by the spring 54, and cam surface 52 forces ball 48 upwardly into a notch 46. Rod 28 is thus prevented from moving axially within the block 30. The seat back 22 is thus held securely relative to the seat bottom 24. When it is desired to release the seat back, pin 50 is forced inwardly against the force of spring 54. The ball may now move downwardly into the channel 53. The ball is now out of the notch 46, and the rod 28 is free to move inwardly or outwardly of the block 30.

As shown in FIG. 5, the rod 28 includes a plurality of notches 46. The spring 54, set screw 56 and pin 40 all extend into their respective openings in the block 30.

This embodiment of the invention provides a strong holding force preventing movement of the rod unless the pin is released.

FIG. 6A shows a second embodiment 60 wherein the moving pin 62 is provided within a block 64. The rod 24 is provided with notches 46 as was the case in the prior embodiment. Notches 46 in this second embodiment may be more rectangular than the curved notches in the prior embodiment. As shown, the pin 62 has a forward end 66 with a tooth 68. The tooth 68 is biased by spring 70 to a location where it is received within notch 46. Thus, the spring force causes the tooth 68 to lock the rod 28 within the block 64.

As shown in FIG. 6B, the operator has now moved the pin 62 into the block 64 and the tooth is moved beyond notch 46. In this position, the rod 28 may move freely within the block 64.

Again, this embodiment provides a very strong holding force preventing movement of the rod, and hence seat back 22, unless the lock is released by the operator.

FIG. 7 shows yet another embodiment 80. Embodiment 80 includes a rod 82 having a threaded outer surface 84. The spaces between the threads provide a similar function to the notches described in the above embodiments. A rotating actuation cam 86 is received within a block 88. Actuation cam 86 is received within a groove 90 in the back of a lock seat member 92. Springs 94 bias lock seat 92 upwardly against the actuation cam 86.

As shown in FIG. 8A, the actuation cam has an eccentric portion 95. The eccentric portion 95 is shown at a vertically lowermost position in the FIG. 8A location. In this position, lock seat 92 is forced downwardly such that teeth 96 on lock seat 92 are received within the threads 84 or notches on the rod 82. Thus, the rod 82 is locked at a plurality of positions by the lockseat 92.

FIG. 8B shows the location of the members when the rotary cam member 95 is rotated to a released position. In this position, the eccentric portion 95 is spaced upwardly. Springs 94 now bias the lock seat 92 upwardly such that teeth 96 are no longer in contact with thread notches 84. In this position, the rod 82 may move freely within the block 88.

FIG. 9 shows the exploded view of this third embodiment. The block 88 includes appropriate holes to receive seat 92, cam 86, and a handle 100 for actuating the cam 86. A spring 102 is shown schematically. The spring normally biases the cam 86 to the position such as shown in FIG. 8A wherein it locks the rod 82 within the block 88. A worker of ordinary skill in the art would be able to devise a suitable spring structure for providing this bias force.

Although the third embodiment is most preferably utilized with the threads to provide a number of mating contact surfaces, this embodiment could also be utilized with a smooth surface rod 82 and a smooth surface seat 92. The cam force from the rotating cam surface 95 would still be sufficient to force the seat 92 onto the rod 82 and lock the rod 82 with a very strong holding force.

As shown in FIG. 10A, another embodiment 120 includes a first rack 122 having a pin connection 124 which may be connected to the seat back pivot as in the earlier embodiments. Rack 122 includes gear teeth 126 engaged by a pinion gear 128. A second rack 130 includes its own gear teeth 132 arranged on an opposed side of the pinion gear 88. Racks 130 and 122 are both received within a sliding block 94. Rack 130 is pinned at 96, preferably to the seat bottom. Now, when the pinion gear 128 is driven, it drives the teeth 126 and 132. This allows the points 124 and 136 to be moved towards or away from each other. This allows the seat back to pivot relative to the seat bottom. When it is desired to pivot the seat back in an opposed direction, the rack movement is reversed by reverse rotation of the pinion 128. When the seat back is in its normal operative position, the rack members 122 and 130 are locked in place by having teeth from the pinion gear 128 received in their teeth 126 and 132 respectively. In this sense, the teeth from the pinion gear 128 move into the gear teeth openings on the rack, locking the racks at a desired position.

As shown in Figure 10B, the pinion gear 128 is driven as by a motor 138, shown schematically. An appropriate control is provided with an operator input such that the operator could cause the seat back to pivot or move back to its normal position as desired.

Preferred embodiments of this invention have been disclosed, however, a worker of ordinary skill in the art would recognize that certain modifications would come within the scope of this invention. For that reason, the following claims should be studied to determine the true scope and content of this invention.

We claim:

1. A seat comprising:

a seat back;

a seat bottom, said seat back being pivotally attached to said seat bottom, a rod fixed for movement with said seat back, said rod selectively axially movable relative to a member fixed to said seat bottom;

a lock for locking said rod within said seat back, said lock including a lock portion moved into a notch in said rod to lock said rod relative to said member at a desired location; and said lock including a cam member which forces and holds said lock member into said notch, said rod having a plurality of notches and said lock member being a moving member which includes a plurality of locked portions forced into said notches, a spring biasing said moving member away from said rod, and said cam contacting and forcing said moving member toward said rod such that said locked portions are forced into said notches and said cam holding said locked portions in said notches.

2. A seat as recited in claim 1, wherein said moving member is a lock seat which is forced by a rotary cam onto said rod to lock said seat on said rod.

3. A seat as recited in claim 1, wherein said lock portion is a rotating pinion gear, and said member is a second rod, both said first and second rods being formed with gear teeth to provide rack portions.

4. A vehicle seat comprising:

a seat back and a seat bottom which are hingedly connected;

a rod fixed for movement with said seat back, a block fixed for movement with said seat bottom, said rod selectively slidable within said seat bottom;

a lock for locking said rod within said seat bottom, said lock including a moveable member which is forced by a mechanical cam connection to be driven to a position at which it locks said rod within said block; and said moving member being a lock seat, and said cam being a rotary cam rotatable between an actuated and an unactuated position said rotary cam mechanically forcing said locked seat onto said rod at said actuated position, said cam having an eccentric portion in contact with said moving member and said eccentric portion forcing said moving member into said rod, and there being interengaging structure between said moving member and said rod which locks said rod when said moving member has been forced into said rod.

5. A seat as recited in claim 4, wherein said rod has a plurality of incrementally spaced notches, said lock seat having a plurality of lock portions, and said lock seat lock portions forced into said notches on said rod by said rotary cam.

6. A seat as recited in claim 4, wherein said moving member includes a plurality of lock portions and said rod having a plurality of teeth, said locked portions being forced into said teeth by said rotating cam.

* * * * *